United States Patent [19]

Epple et al.

[11] Patent Number: 4,736,487
[45] Date of Patent: Apr. 12, 1988

[54] WINDSHIELD WIPER ARRANGEMENT

[75] Inventors: Anton Epple, Rottenburg; Hans Trube, Herrenberg; Martin Pfeiffer, Stuttgart, all of Fed. Rep. of Germany

[73] Assignee: Daimler-Benz Aktiengesellschaft, Fed. Rep. of Germany

[21] Appl. No.: 906,512

[22] Filed: Sep. 4, 1986

[30] Foreign Application Priority Data

Sep. 6, 1985 [DE] Fed. Rep. of Germany ....... 3531858

[51] Int. Cl.4 .................................................. B60S 1/02
[52] U.S. Cl. .............................. 15/250.31; 15/250.15; 15/250.16; 267/69; 267/141; 267/153; 74/581
[58] Field of Search .......... 15/250.13, 250.14, 250.15, 15/250.16, 250.27, 250.31; 74/581; 267/63 R, 69, 70, 73, 141, 141.1, 153

[56] References Cited

U.S. PATENT DOCUMENTS 1,720,545  7/1929  Dickey ........................... 267/141.1
2,745,130  5/1956  Oishei .......................... 15/250.27 X
3,336,619  8/1967  Hoyler ............................ 15/250.14
3,363,475  1/1968  Foster et al. ..................... 74/582 X

FOREIGN PATENT DOCUMENTS 862903   3/1961  United Kingdom ............. 15/250.16
2029542  3/1980  United Kingdom ............. 15/250.16

Primary Examiner—Peter Feldman
Attorney, Agent, or Firm—Barnes & Thornburg

[57] ABSTRACT

A force responsive, variable length push rod for connecting the motor and windshield blade of a windshield wiper unit. The variable response push rod includes a pair of members connected at one end to the motor and windshield blades respectfully and overlapped at the other end. Each member includes a plurality of lobes extending to the area between the opposed members and an elastomer adheres to the lobes and fills space between the plurality of lobes to form push rod. Interdigitized lobes and elastomer define the force characteristics of the push rod.

14 Claims, 2 Drawing Sheets

WINDSHIELD WIPER ARRANGEMENT

BACKGROUND AND SUMMARY OF THE INVENTION

The invention relates generally to a windshield wiper arrangements particularly for motor vehicles, and more specifically to drive units having changing length push rods.

An arrangement having a part, which prevents blocking of or damage to the windshield wiper unit, installed in the force-transfer path from the motor to the wiper blade, is known from the U.S. Pat. No. 3,336,619. Here, the lever leading to a wiper bearing is made in two pieces and an arrangement is created in between which allows change in length of the lever when the wiper is impeded. This arrangement includes two tubes, which are inserted into one another and are elastically connected by a spring, and an additional safety bolt which limits the change in length to a maximum amount. To obtain a frictional connection for normal wiper operation, which connection can transfer the movement of the drive motor to the wiper bade and moreover is so rigid that no chattering occurs in the wiper blade, the spring must either be made rigid or installed in pretensioned manner. However, this necessitates very high blocking forces until the protective action occurs which results from the adjusting displacement of the spring. It is therefore possible for some parts of the windshield wiper unit to have already sustained damage by then. It is therefore difficult in this arrangement to achieve an acceptable compromise between rigid forced transfer and adequate tensile and compressive elasticity when the wiper blade is blocked.

The object of the invention is therefore, by means of an elastic push rod, to protect a windshield wiper unit from damage by blocking and at the same time to construct the push rod in such a way that absolute stability in every loading condition is achieved with few components. Moreover, the expense is to be reduced by using simple parts in mass production and to fully automatic manufacture, but with it being necessary to retain the simple adaptation to various windshield wiper units.

These and other objects of the invention are attained by providing a unique force responsive, varible length push rod between the motor and the windshield wiper for a windshield wiper unit. The force responsive, variable length push rod includes two members, one being connected at one end to the motor and the other being connected on end to the wiper blades. The other ends of the two members overlap each other with a space therebetween. Each member includes a plurality of lobes extending into the space between the members and an elastomer adheres to and fills the space between the plurality of lobes thereby forming the force responsive, variable length push rod. The lobes are of equal length and are formed to extend perpendicular from a base portion of each member, the base portion being parallel to each other in the overlap area. The lobe members are equally spaced along the axis of overlap from each other and from an adjacent interdigitized lobe of the other member. The lobes are formed by stamping the base portion and bending them perpendicular thereto leaving an opening. The lobe of the one member is centered on the opening of the opposed member. The base of the lobes for both members may be formed identical to each other and have distinctive lever portions welded thereto.

At the same time, the elastomer forms a volume which can be compressed or extended by the force initiation via the lobes. The fixed connection of the parts ensures an optimum, direct force transfer in wiper operation and moreover stability and guidance properties of the push rod subjected to additional loading. At the same time, because of the separation of the metal parts by the elastic connection, the vibrations and noise produced by the drive motor are absorbed. The elastomer, which can be extended or compressed from a certain loading lever, ensures that the excess movement of the drive side is compensated.

At the same time, the necessary loading magnitude from which compensation is necessary in the push rod can be introduced via the area of the lobes multiplied by their distance from one another and via the Shore hardness. The push rod, with simple changes, can thereby be adapted to every windshield wiper unit. The components are to be manufactured as a mass produced product and can also be assembled automatically to form the push rod.

Further objects, features, and advantages of the present invention will become more apparent from the following description when taken with the accompanying drawings which show, for purposes of illustration only, an embodiment in accordance with the present invention.

DETAILED DESCRIPTION OF THE DRAWINGS

Figure 1:
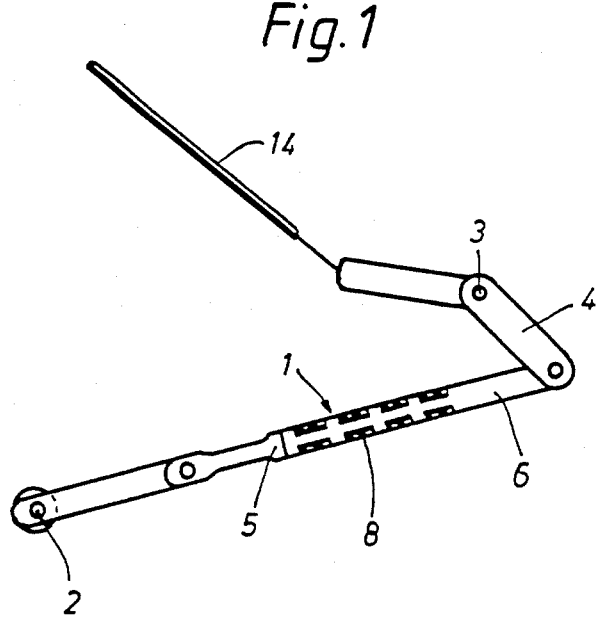
FIG. 1 shows a general view of the arrangement in the transfer mechanism.

An arrangement of the elastic push rod 1 in the transfer mechanism of a windshield wipe unit is apparent from FIG. 1.

The motor output shaft of a windshield wiper motor rotates during operation of the windshield wiper unit. The push rod 1 is mounted one side to windshield wiper motor 2 and moves about a rotational axis on a circular path. The rotary movement of the motor 2 is converted into a reciprocating wiper movement by the push rod 1 being connected on the other side in articulated manner to a lever 4 mounted at a fixed point 3. If a wiper blade 14, in the case of a common, fixed push rod, is impeded in its displacement path an obstacle, the rotary movement of the motor 2 can no longer be continued and the motor 2 or the transmission linkage is damaged. In a windshield wiper unit with the elastic push rod 1 according to the invention, the push rod is extended or compressed to such an extent that it is possible for it to continue the rotary movement, produced by the drive motor 2, until it returns into the area where the increased wiper resistance no longer occurs. At this stage, the push rod 1 returns elastically to its initial lenth. The wiper travel angle remains reduced until the obstacle on the windshield has been removed.

Figure 2:
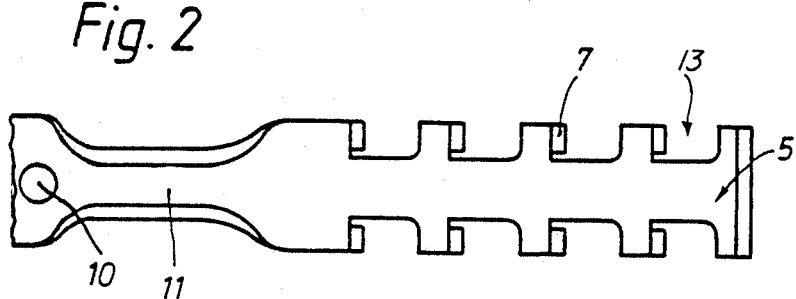
FIG. 2 is a plan view of the first component of the push rod.
Figure 3:
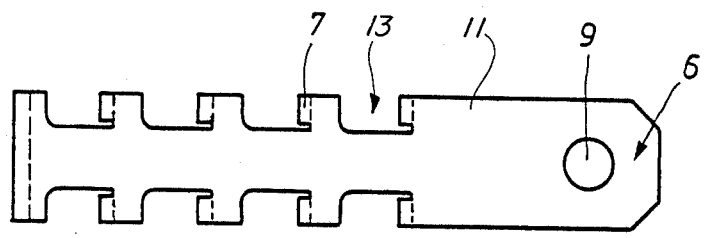
FIG. 3 is a plan view of the second component of the push rod.
Figure 4:
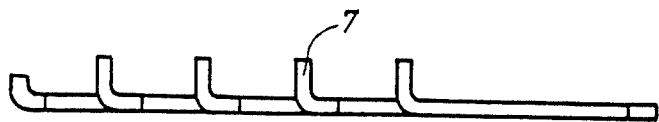
FIG. 4 is a side view of the second component of FIG. 3.

The design of the components 5 and 6 of the elastic push rod 1 is depicted in FIGS. 2, 3 and 4. Each of the two components 5 and 6 has a rectangular, flat base into which rectangular lobes 7 are stamped and disposed upright at right angles on one side of the component 5 and 6. The lobes are equally distinct and are formed in two spaced rows. Clearance spaces 13 are also produced by the stamping. When the push rod 1 is loaded, these lobes 7 then serve to initiate the force transfer of the two components 5 and 6 relative to one another.

At the same time, a force initiation area, which acts on the volume of the elastomer 8 between the lobes 7, results from the height and width of the lobes 7. Moreover, the components 5 and 6 are provided with bores 9 and 10 and integrally formed portions 11 which serve as push rod 1 in the entire transfer mechanism.

Figure 5:
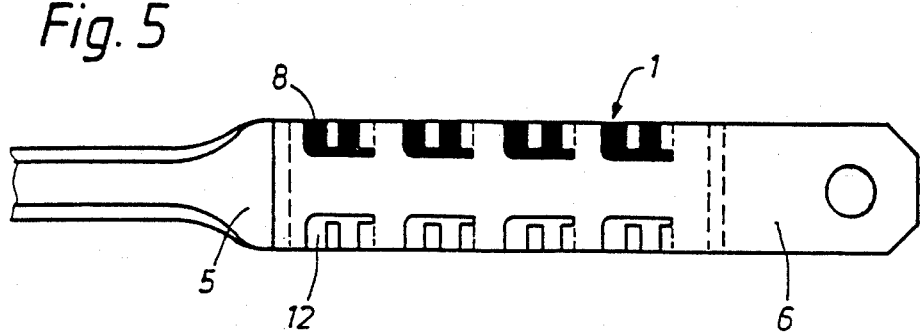
FIG. 5 is a plan view of the push rod assembly with the two components interlinked and with injected elastomer.

The push rod 1, according to the invention, shown in Figure 5 is constructed from two components 5 and 6 have overlapping, spaced portions which, depicted in the lower part, with interdigitized lobes 7 and, depicted in the upper part, are firmly connected by an elastomer 8 filling the hollow spaces 12 between the base and lobes 7.

Figure 6:
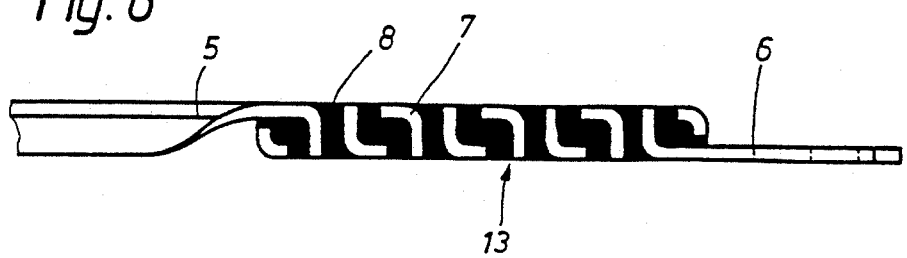
FIG. 6 is a side view of the push rod assembly.

The connection of the components 5 and 6 by the elastomer 8 adheres to the lobes as can be seen in FIG. 6. The effective volume of the elastomer 8 is obtained from the area of the lobes multiplied by the respective distance of the lobes 7 from one another. At the same time, it is useful to arrange the oppositely located components 5 and 6 in such a way that the lobe 7 of one component 5 and 6 comes to lie approximately in the center of a clearance space 13 of the other component 5 or 6, which clearance space 13 developes as a result of the upright disposition of the lobe 7. This ensures that an adequately variable elastomer volume is available for tension and compression on the push rod 1.

In the case of tensile and compression force in the longitudinal direction of the push rod 1, this force is introduced into the lobes 7 of one of the components 5 and 6 is directly tranferred to the other component 5 and 6 via the elastomer 8. If this force becomes larger as a result of a wiper blade 14 being impeded and therefore the push rod 1, the elastomer 8 is extended or compressed and thus permits the further rotary movement of the push rod 1 on one side while the other side is blocked. The limit or value at which the elastomer 8 compresses is determined by dimensioning of the components 5 and 6 and by the Shore hardness of the elastomer 8.

Figure 7:
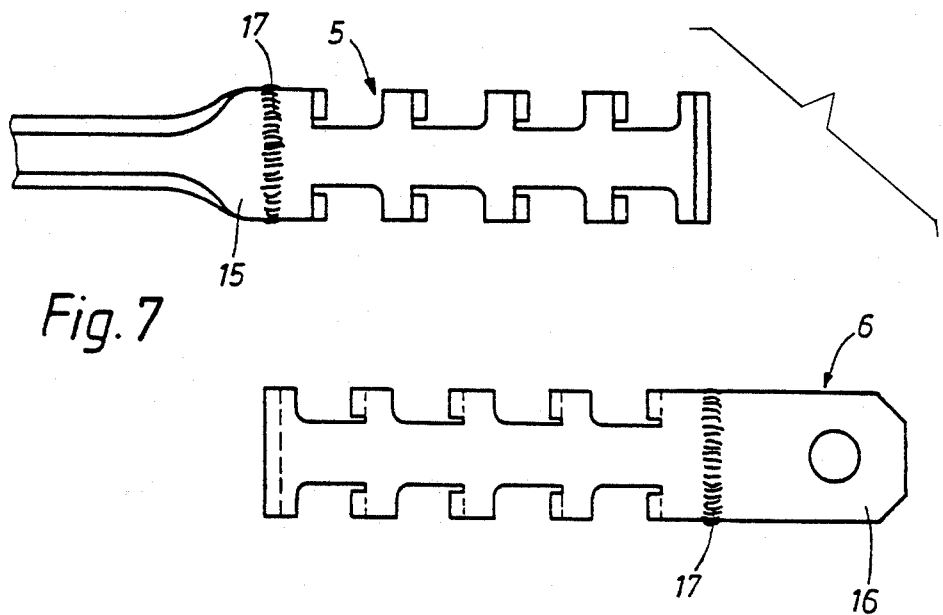
FIG. 7 is a plan view of the two components welded to the push-rod levers.

A design of the elastic push rod 1, which design is especially easy to produce, can be seen in FIG. 7. Here, the components 5 and 6 are made in two pieces, with the lobed areas being of exactly identical configuration, in other words they can be made as identical parts. These areas are then connected to the corresponding push rod levers 15 and 16 via a weld 17.

The description of the push rod according to the invention shows that, with few, simple components, an effective blocking protection is thereby ensured for the windshield wiper motor and that the windshield shield wiper unit, when a wiper blade is impeded, remains fully functional in the restricted wiping zone.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. In a windshield wiper unit, in particular for motor vehicles, having a drive motor and a transfer mechanism which converts the movement of the motor into a movement of the wiper blade and, when the wiper blade is blocked, absorbs the drive-side movement in that a push rod of the transfer mechanism consists of two parts which overlap in their end areas facing one another and are connected there by elastic means in such a way that they permit a change in length of the push rod to a certain extent when the forces of normal wiper operation are exceeded, the improvement being said push rods which comprise two components, having overlapping ends, each component in the area of overlap include, a plurality of individual formed-out lobes disposed upright at substantially right angle overlap without contact and form several spaces therebetween along said length, an elastomer filling said spaces and firmly adhering to the lobes.

2. In a windshield wiper unit according to claim 1, wherein the lobes are portions of the components which are of equal size.

3. In a windshield wiper unit according to claim 1, wherein the lobes engage in the center of the clearance space which has developed on the opposite component.

4. In a windshield wiper unit according to claim 1, wherein each component is made in two pieces, with the lobed area of the two components and an associated push-rod lever forming a weldment.

5. A force responsive, variable length push rod comprising:
   two members to be connected at one end to a motor and a wiper blade respectively and overlapping at another end along on axis of overlap with a space therebetween,
   each member including a base portion substantially parallel to the base portion of the other member and a pluality of lobes extending substantially perpendicular from said base portions overlapping in said space between said members; and
   elastomer adhering to and filling the space between said plurality of lobes.

6. A push rod according to claim 5, wherein said plurality of lobes are equal in size.

7. A unit according to claim 5, wherein said lobes of one member are equally spaced along the axis of overlap from an adjacent lobe of the other member.

8. A unit according to claim 5, wherein said lobes on each member are spaced along the axis of overlap and they extend interdigitized into said space between said members.

9. A unit according to claim 8, wherein said lobes are equally spaced on each member.

10. A unit according to claim 8, wherein each member includes two adjacent rows of lobes extending along the axis of overlap.

11. A unit according to claim 5, wherein said member and lobes are integral and said lobes being extention of base portion of said member.

12. A unit according to claim 11, wherein the lobes of one member is positioned center in the opening in the base portion of the other member.

13. A unit according to claim 5, wherein each member includes a lever portion and a lobe portion mounted to and extending from said lever portion, said lobe portion of each member being identical.

14. A unit according to claim 13, wherein said lobe portion and said lever portion form a weldment.

* * * * *